United States Patent Office 3,597,192
Patented Aug. 3, 1971

3,597,192
PREPARATION OF TANTALUM METAL
Harley A. Wilhelm, Frederick A. Schmidt, and Roger M. Bergman, Ames, Iowa, assignors to the United States of America as represented by the United States Atomic Energy Commission
No Drawing. Filed Dec. 5, 1968, Ser. No. 781,583
Int. Cl. C22b 51/00
U.S. Cl. 75—84                                                    5 Claims

ABSTRACT OF THE DISCLOSURE

This invention relates to an improved method of preparing high-purity tantalum metal by the alumino-thermic reduction of $Ta_2O_5$. By adding selected alloying agents to the aluminum and tantalum oxide, a massive metal alloy readily separable from the slag is produced upon reduction of the mixture. The high-purity tantalum metal is then recovered by heating the alloy under reduced pressure to a temperature sufficient to boil off the alloying metals.

CONTRACTUAL ORIGIN OF THE INVENTION

The invention described herein was made in the course of, or under, a contract with the United States Atomic Energy Commission.

BACKGROUND OF THE INVENTION

This invention relates to a process for producing highly purified refractory metal. More specifically, this invention relates to an improvement in the alumino-thermic process for the reduction of $Ta_2O_5$ to produce high-purity tantalum metal.

Reduction of tantalum compounds to tantalum metal is feasible by any of several methods, for example, electrolysis, sodium reduction and the interaction of tantalum oxide and tantalum carbide. In these processes, the tantalum metal is recovered as a powder or sponge rather than as a massive metal. A number of additional steps are required in order to obtain a pure massive tantalum metal product.

Considerable effort has been expended on the development of an alumino-thermic process for the reduction of tantalum oxide to massive metal with limited amounts of success. By reducing the oxide with a stoichiometric amount of aluminum, a metal powder is produced which is mixed with the slag. In order to purify the metal, it is necessary to grind up the slag and leach the powdered metal and slag with water and hydrochloric acid to remove the slag. The metal powder must then be pressed into shape and sintered before further purification steps can be carried out.

A massive metal has been obtained by the use of large excesses of aluminum in reducing the tantalum oxide. The metal contains large amounts of aluminum which must be removed by leaching with molten copper or precious metals. Although this method is satisfactory, the tantalum metal which remains after leaching is in powdered form and requires the additional steps before further processing can be carried out.

SUMMARY OF THE INVENTION

We have developed a process for producing high-purity tantalum metal which requires relatively few steps and which eliminates many of the problems associated with the prior art.

By the process of our invention, a massive tantalum metal alloy is produced which is easily separated from the slag. The tantalum metal alloy is easy to handle and can readily be purified of the alloying metals to obtain the pure tantalum metal.

This massive metal is produced by mixing the tantalum oxide to be reduced with aluminum and a small amount of an alloying agent. The resulting mixture is placed in a reduction bomb and ignited electrically or by heating the bomb until the reduction reaction takes place. Upon completion of the reaction and upon cooling, a single massive metal tantalum alloy is obtained which is easily separable from the slag. The tantalum metal is then purified by electron beam melting or by other methods for removing the alloying metals from the alloy.

DESCRIPTION OF THE PREFERRED EMBODIMENT

The reduction charge must contain sufficient aluminum to reduce all oxides present. Amounts less than this stoichiometric quantity will result in decreased tantalum yields. The charge may contain up to 15% excess of aluminum as calculated on the theoretical yield of tantalum and the alloying agent selected. An excess greater than 15% is unnecessary and is merely excess metal which must be removed from the alloy to obtain pure tantalum metal. Even though less than stoichiometric amounts of aluminum may be used in the charge, the alloy will generally contain from 1–2% of aluminum because of the solubility of aluminum in the tantalum.

The amount of alloying agent to be used is determined from the theoretical yield of the tantalum to be formed by the reduction. It is important that sufficient alloying agent be added to the charge to produce an alloy having a melting temperature low enough to form a metal mass from the heat in the reduction reaction. It is also important that the quantities of alloying agents be as low as practicable in order minimize the amount of metal which must be removed in order to obtain the pure tantalum metal.

Iron, silicon and manganese were all found to work quite well as alloying agents in the reduction of tantalum oxide. In general, all alloy compositions that give good results with respect to both tantalum alloy production and tantalum metal purification contain no more than a total of 20% of these elements alone or in combination with each other and aluminum.

Generally good alloying results and tantalum yields may be obtained when the alloy contains up to 15% iron. Although 6 to 12½% of iron concentration is preferred, tantalum yields of from 85 to 90% were achieved when the alloy contained 6½ to 7½% iron and 1 to 2% aluminum, that is, the amount of aluminum which will be found in the alloy when a stoichiometric amount is added to the reduction charge.

Because silicon has a profound effect upon the melting point of the tantalum, only very small amounts are required as an alloying agent. Thus, although up to 5% of silicon in the alloy provided good results, 1½ to 3% is preferred to minimize the quantity which must be removed from the tantalum metal upon purification. With silicon it is preferred that the aluminum concentration be from 3 to 5%, because tantalum yields are found to be decreased when the aluminum present in this alloy is less than 3%.

A combination of silicon and iron as alloying agents will also give good results and has the advantage of adding only small amounts of material which must later be removed from the alloy. Tantalum yields of almost 90% are achieved when the alloy contains 1¼% silicon and 3% iron.

Although manganese also works well as an alloying agent, larger amounts are necessary and best results are achieved when it is used in combination with additional aluminum. Thus, yields of 80 to 85% tantalum are obtainable when the tantalum alloy contains 10 to 20% of manganese and aluminum combined. Although combined amounts of 15 to 20% are preferred, the concentration of either element should not be less than 4% nor greater than 16%. It will be noted that purification of the tantalum metal by electron beam melting is more difficult when manganese is used because of the excessive volatility of the metal and because much greater quantities are present to be removed from the alloy.

Purification of the tantalum may be accomplished by heating the alloy under reduced pressure to a temperature sufficient to boil or drive off the alloying metals. Electron beam melting alone was found to give good purification results when purifying tantalum alloys containing iron and silicon. Alloys which contained manganese and an excess of aluminum should first be prepurified by vacuum induction heating or other methods for removing the excess alloying metals. There is a small loss of tantalum due to spattering which results as some of the alloying agents are driven off. Arc melting was also found to provide quite good results, either in combination with vacuum induction heating or with the electron beam melting.

Reduction of the tantalum oxide is carried out by bomb reduction using a conventional iron bomb which has been lined with refractory material such as aluminum oxide. The amount of thermal boosters in the reduction charge is dependent upon whether alloying agents are used in the form of oxides or as metals. Additional boosters are also necessary if the reduction charge is ignited electrically rather than by heating in a gas furnace to ignition temperature. Such matters are known to those skilled in the art and constitute no part of the present invention.

The paricle size of the reactants is not paricularly important, merely that they be small enough that an intimate mixture can be obtained before placing in the reduction bomb.

The process of this invention may also be used to make tantalum alloys having commercial utility by varying the composition and quantity of the reactants and alloying agents used in the reduction charge.

This process, although designed to produce pure tantalum metal, is adaptable to the reduction and purification of a number of other refractory metals such as tugnsten and molybdenum.

The following examples are given to illustrate the process of this invention and are not to be taken as limiting the scope thereof.

EXAMPLE I

A 2½" internal diameter iron reduction bomb was prepared by jolt packing an $Al_2O_3$ liner ¼" thick on the sides and ½" on the bottom of the bomb, using a mandrel. A reduction charge was prepared by intimately mixing 250 grams $Ta_2O_5$, 3.4 grams silicon, 39 grams $KClO_3$ and 73.2 grams powdered aluminum. The charge was placed in the bomb, topped with $Al_2O_3$ and the bomb capped. The charged bomb was placed in a gas furnace which had been preheated to about 250° C. in order to stabilize it and the bomb was then heated to ignition which took place when the furnace temperature increased to abou 1000° C.

After completion of the reaction and upon cooling, the bomb was opened to reveal a single massive metal button, which was easily separated from the slag. The button wighed 187 grams which is consistent with an 87% tantalum yield. Upon analyses, the button was found to contain 2.8% aluminum, 1.6% silicon and 96% tantalum. The button was then purified by electron beam melting to a high-purity ductile tantalum metal having a DPH of 76 to 78. Upon emission spectroscopy, the metal was found to contain <100 p.p.m. silicon. No aluminum was detected.

EXAMPLE II

An iron reduction bomb was prepared as described before and filled with a reduction charge of the following composition: 250 grams $Ta_2O_5$, 23.75 grams $Fe_2O_3$, 13.0 grams $KClO_3$ and 65.6 grams of aluminum. The bomb was heated in a gas furnace until ignition occurred and cooled to ambient temperature. The well-formed single massive metal button weighed 186 grams, consistent with a tantalum yield of 83%. The button was found to contain 7.5% iron, 1% aluminum and 91% tantalum. After purification of the metal alloy by electron beam melting, the tantalum metal had a DPH of 75, and by emission spectroscopy was found to contain less than 100 p.p.m. iron. No aluminum was detected.

EXAMPLE III

After preparing a 2½" iron bomb as described previously, it was filled with a charge of 250 grams $Ta_2O_5$, 30 grams $Fe_2O_3$, 5 grams silicon and 62.1 grams aluminum. Upon reduction, a single massive metal button was obtained weighing 202.5 grams, which is consistent with a tantalum metal yield of 86.5%. Analysis disclosed the metal alloy contained 2.35% silicon, 9.34% iron, 1.6% aluminum and 86.7% tantalum. After purification by electron beam melting, the ductile tantalum metal had a DPH of 73.4. Emission spectroscopy showed no aluminum, less than 100 p.p.m. iron and less than 100 p.p.m. silicon.

EXAMPLE IV

A charge containing 200 grams $Ta_2O_5$, 15 grams $Mn_2O_3$, 7.5 grams $KClO_3$ and 69 grams aluminum was placed in a 2½" iron reduction bomb prepared as described before. After reduction, a single metal button weighing 172 grams was obtained, which is equivalent to a tantalum yield of 88.5%. Analysis of the alloy showed 4.70% manganese and 11.68% aluminum, the remainder being tantalum. The alloy was induction heated under reduced pressure to 1900° C. and maintained there for four hours. Upon cooling, analysis showed the alloy to contain 0.3% manganese and 1½% aluminum. The remaining sponge metal was then electron beam melted for final purification. The tantalum metal obtained had a DPH of 78, contained less than 100 p.p.m. of manganese and no detectable aluminum.

It can be seen from the above examples that by the process of this invention good yields of high-purity tantalum metal are consistently and readily obtainable.

It will be understood that the invention is not to be limited by the details given herein but that it may be modified within the scope of the appended claims.

The embodiments of the invention in which an exclusive property or privilege is claimed are defined as follows:

1. In the method of producing pure tantalum metal by thermal reduction of a mixture of tantalum oxide, aluminum and a thermal booster to a tantalum alloy containing aluminum and thereafter purifying the alloy, the improvement comprising: adding at least a stoichiometric amount of aluminum to said mixture, adding an alloying agent to said mixture, said agent being selected from the group consisting of iron, silicon and manganese, said alloying agent being added to said mixture in an amount sufficient to produce upon the thermal reduction of said mixture a tantalum alloy containing aluminum and containing up to 15 percent iron or up to 5 percent silicon or up to 16 percent manganese, and heating said alloy under reduced pressure to a temperature sufficient to drive off said aluminum and said alloying agent, thereby leaving pure tantalum metal.

2. The method of claim 1 wherein the alloy contains up to 2% aluminum and up to 15% iron.

3. The method of claim 1 wherein the alloy contains up to 5% aluminum and up to 5% silicon.

4. The method of claim 1 wherein the alloy contains up to 2% aluminum, up to 1¼% silicon and up to 3% iron.

5. The method of claim 1 wherein the alloy contains from 4 to 16% manganese and 4 to 16% aluminum but not more than 20% of manganese and aluminum combined.

References Cited
UNITED STATES PATENTS

| | | | |
|---|---|---|---|
| 3,132,024 | 5/1964 | Matricardi | 75—84 |
| 3,425,826 | 2/1969 | Schmidt et al. | 75—84 |

CARL D. QUARFORTH, Primary Examiner

R. L. TATE, Assistant Examiner

U.S. Cl. X.R.

75—174